3,385,434
APPARATUS FOR CLASSIFYING OBJECTS ACCORDING TO THEIR INTERNAL STRUCTURE
John R. Nelson, Houston, Tex., assignor to Mandrel Industries, Inc., Houston, Tex., a corporation of Michigan
Filed Sept. 21, 1965, Ser. No. 488,881
13 Claims. (Cl. 209—111.6)

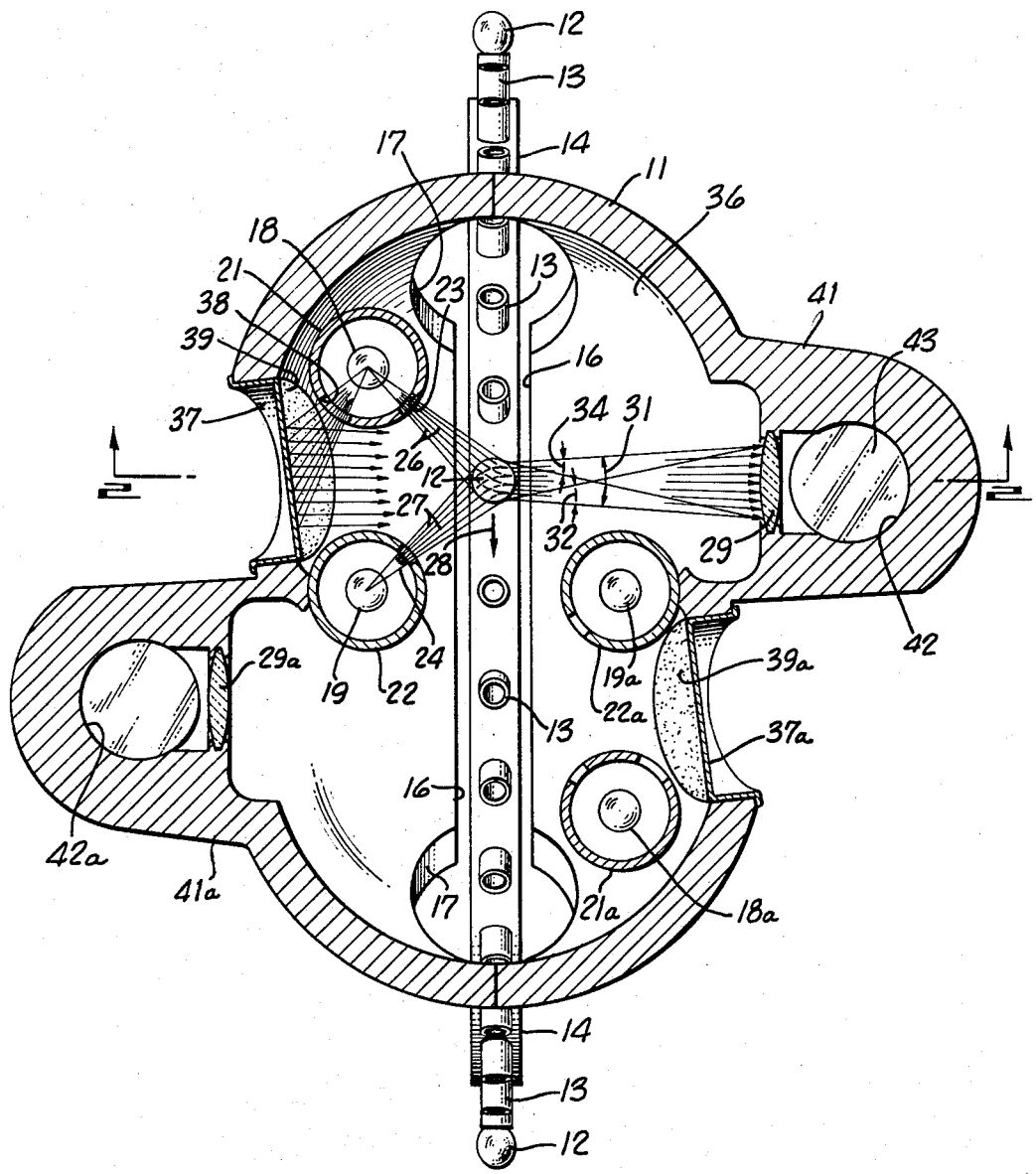
FIG_1
JOHN R. NELSON
INVENTOR.
BY Robert S. Clay
ATTORNEY

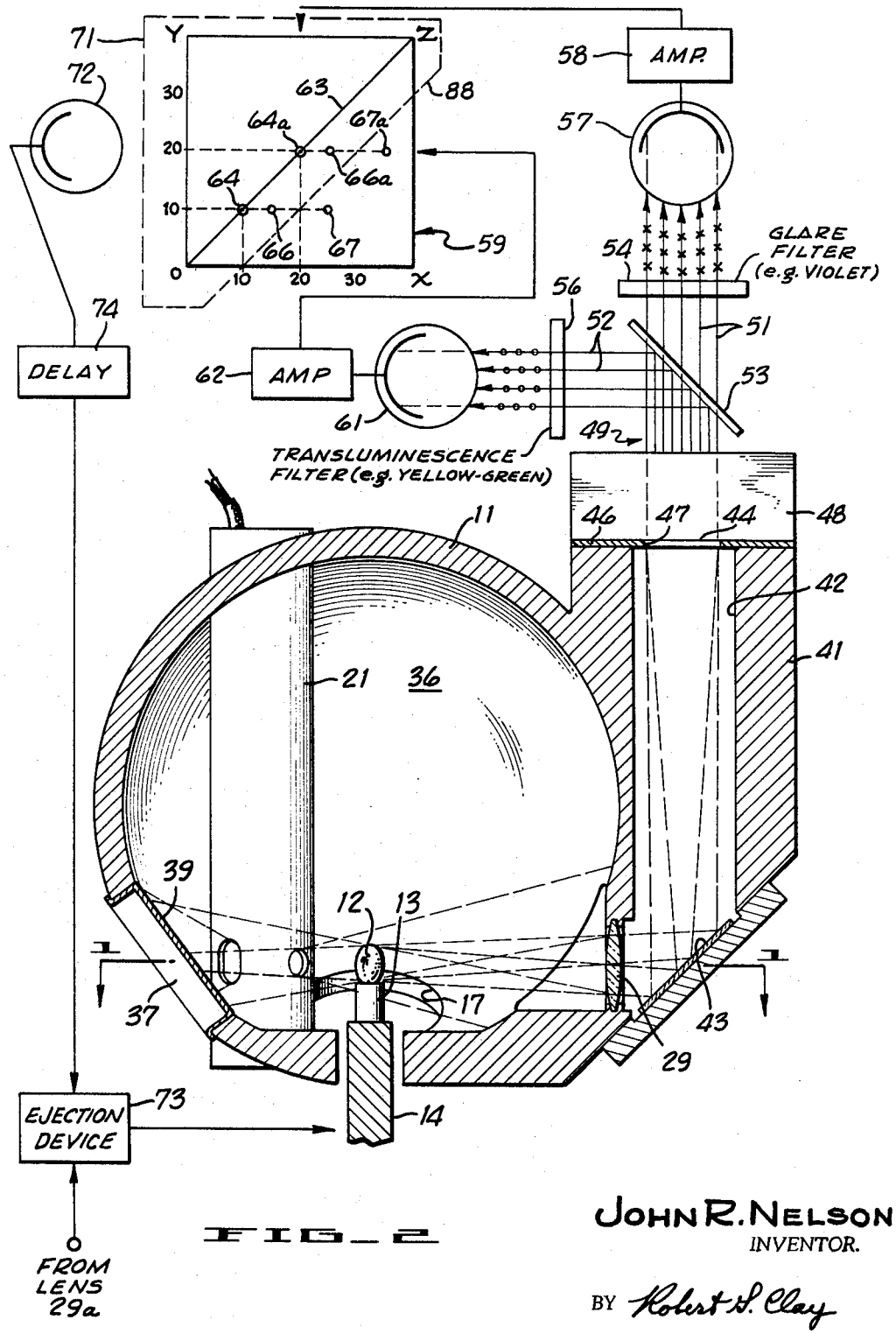
FIG_2

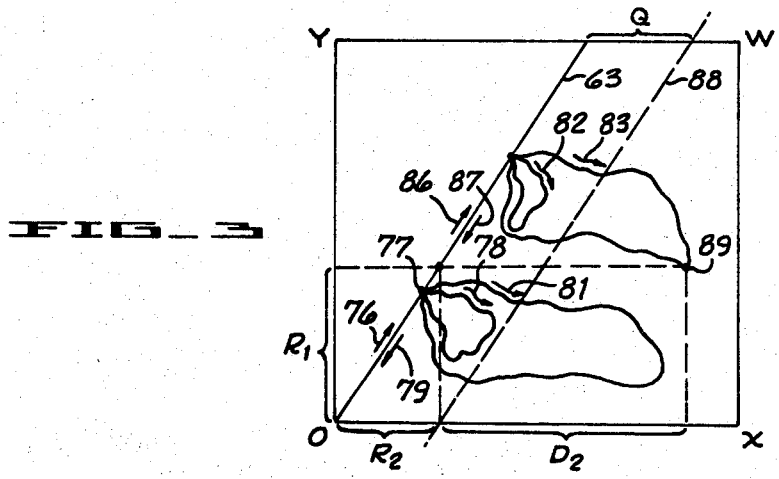
FIG_3
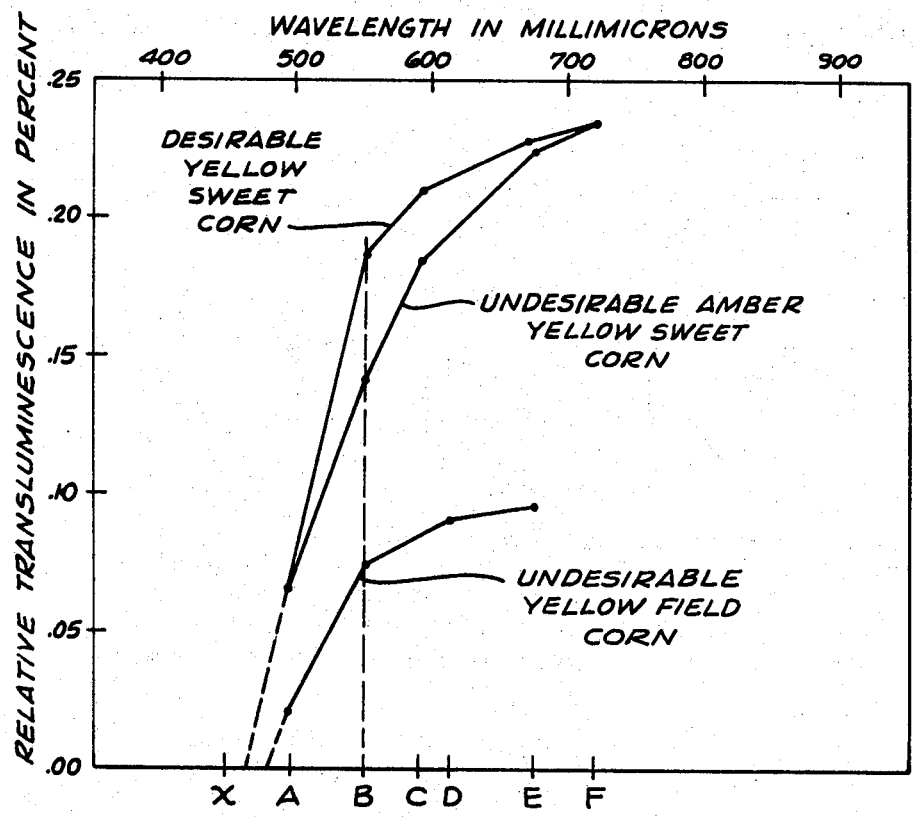
FIG_4
John R. Nelson
INVENTOR.
BY Robert H. Clay
ATTORNEY

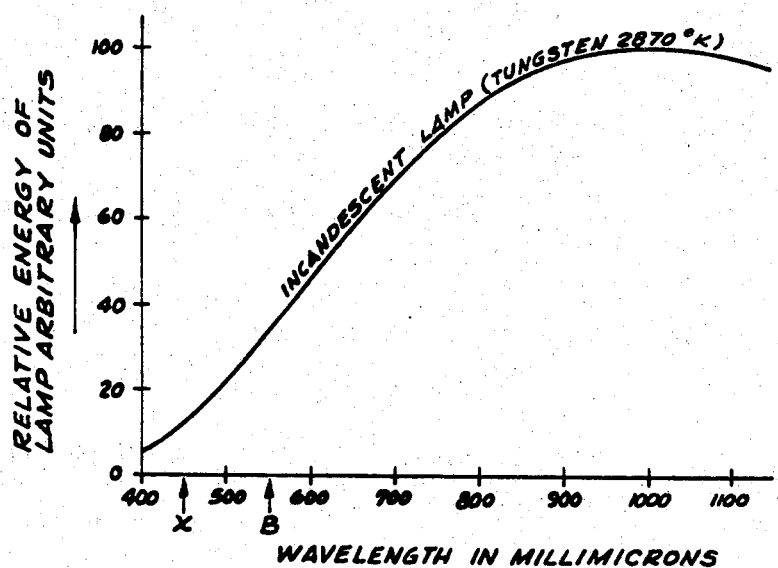
FIG_5
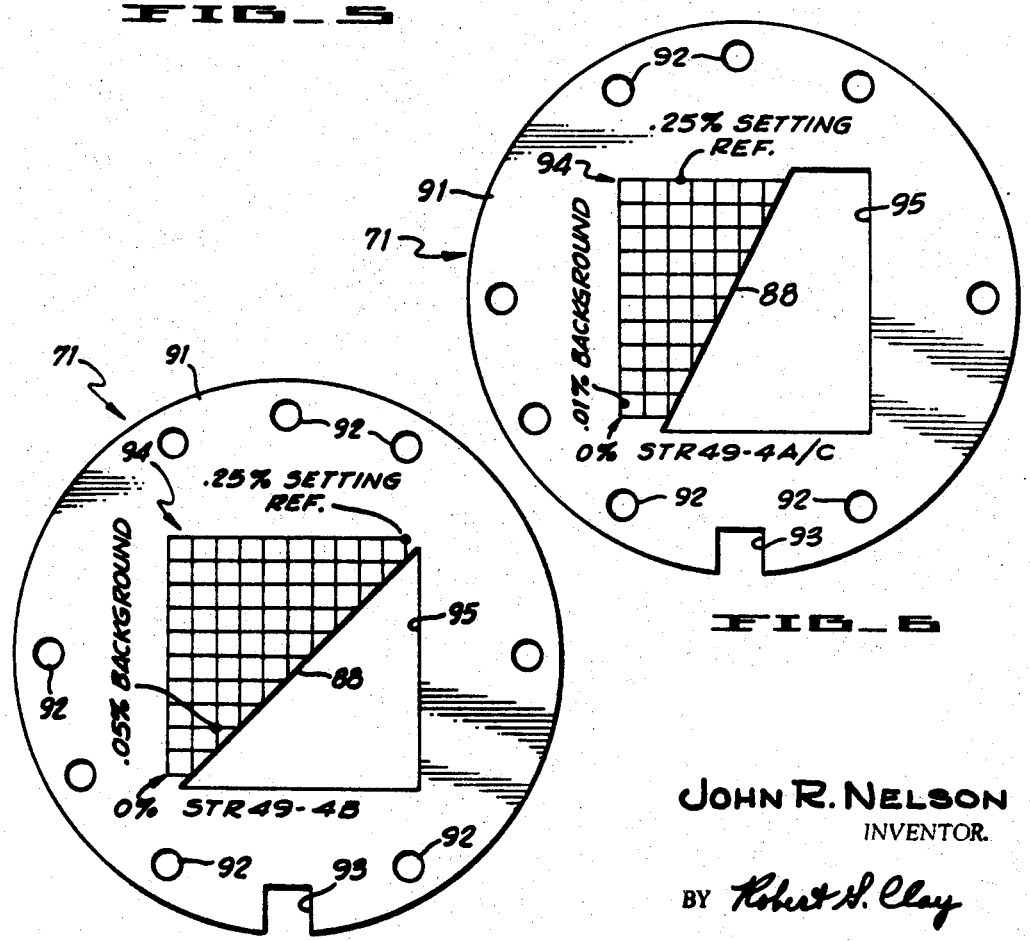
FIG_6
FIG_7
JOHN R. NELSON
INVENTOR.
BY Robert H. Clay
ATTORNEY United States Patent Office 3,385,434
Patented May 28, 1968

ABSTRACT OF THE DISCLOSURE

Kernels of corn are passed rapidly through a light beam, which illuminates their interiors so that a viewing device can classify them as "sweet" or "field" corn, according to the different interior colors that characterize these two types of kernels. The viewing device is arranged not to receive colored light reflected from the surface of the kernel, since both types have the same surface color, and sensings thereof would only be confusing. Specularly reflected light, produced by the leading and trailing edges of the kernel as it enters and leaves the beam, is unavoidably received by the viewing device. However, the confusing effect of this light is cancelled by means of a filter (e.g., violet) that passes light outside the range of internal colors of the kernel, but inside the range of specularly reflected colors. Thus, the intensity of the specularly reflected light is independently measured, and a suitable correction is made, so that the ultimate sensing is based only upon the interior color of the kernel.

This invention relates to apparatus for classifying objects, particularly according to the internal light or other radiation diffusing characteristics of the objects, and independently of the surface reflecting characteristics thereof.

Although the present invention is not so restricted, it will be described with reference to the classifying and sorting of corn (maize) seeds according to their internal optical characteristics.

Previously the food processing art has included apparatus for sorting objects, such as fruit, according to surface color. Such an apparatus is disclosed in U.S. Patent 2,244,826, issued June 10, 1941, for a "Sorting Machine," by David C. Cox. However, a problem arises when it is desired to sort objects according to some characteristic that varies independently of the surface color. For example, in the seed corn industry, it is of great importance to be able to sort kernels of yellow sweet corn from kernels of yellow field corn. Both such types of corn have substantially the same yellow surface color, and cannot be separated by apparatus that relies on surface color reflecting characteristics alone. However, these two types of corn kernels do have different internal structures, and produce different effects when light is passed through, diffused, and re-emitted thereby, in a process that is herein termed "transluminescence."

For example, each corn kernel embodies an endosperm or food sac, which takes up the greater part of the interior volume of the kernel, and initially contains a sugary composition. In field corn kernels, this composition is eventually converted to starch, but in sweet corn kernels it remains sugary. When light of a certain wavelength is passed to the sugary sweet corn endosperm, some of the light is absorbed and some is diffused and re-emitted in all directions. When the same light is passed to the starchy field corn endosperm, substantially more of the light is absorbed and less is diffused and re-emitted. The absorption and diffusion effects are different for various wavelengths of light. For a given wavelength of visible light, the percentage diffused and re-emitted by sweet corn may be on the order of two to three times as great as the percentage diffused and re-emitted by the field corn, and the ratio of these absorption-diffusion-dispersion characteristics for the two types of corn varies from the wavelength to wavelength. It is therefore of advantage to use for comparison the wavelength that provides the greatest differential in these "transluminescence" characteristics. It is important to understand that the emitted light to be measured is diffused light and not merely filtered light that passes straight through the product or is refracted in substantially parallel rays. Diffused and re-emitted light is what is meant herein by the term "transluminescent light."

To make use of different transluminescent characteristics for sorting, it is necessary to eliminate or cancel the effect of light that is reflected from the object. The reflected light varies considerably in amount and intensity according to the attitude assumed by the object in the incident beam, particularly when the object (a corn kernel) is irregular in shape. Size and other characteristics such as surface texture may also produce reflected light variations. If the light coming from the object to the sensing and classifying apparatus contains both reflected and transluminescent light, then irrelevant but unavoidable large-scale variations in the amount of reflected light tend to obscure relevant variations in amount and intensity of transluminescent light, upon which the sorting function depends.

It is therefore an object of this invention to provide an apparatus for sorting objects according to their different internal structures, and according to the correspondingly different effects produced when said internal structures are illuminated by light or other suitable radiation.

In accordance with the invention, non-opaque objects are illuminated one at a time by a beam of light having a predetermined composition. Some of the light is reflected from the surface of each object, and some of the light passes into the interior of the object and is diffused and re-emitted as transluminescent light. The light thus given off by the object is collected and formed into a pair of beams, each containing the same relative proportions of reflected and transluminescent light. One of these beams is passed through a "glare" filter, which passes only a predetermined wavelength band known to be peculiar to the reflected light and to stop all the transluminescent light from all of the objects. The other beam is passed through a "transluminescence" filter, which passes a wavelength band common to both the reflected light and the transluminescent light. The quantities of reflected light passed by the two filters stand always in the same ratio, and it is therefore possible to correct for the effect of reflected light variations. Means are provided to automatically perform such a function, and then to discriminate between the various objects on the basis of the different amounts of transluminescent light passed by them through the "transluminescence" filter alone.

A better understanding of the invention may be had by reference to the following description, taken in conjunction with the accompanying drawings, in which:

FIGURE 1 is a plan cross-section of a portion of the apparatus of the invention;

FIGURE 2 is an elevational cross-section taken substantially on the plane of lines 2—2 of FIGURE 1, and showing further portions of the apparatus schematically;

FIGURE 3 is a schematic view illustrating the operation of the invention;

FIGURE 4 is a graph illustrating the operation of the invention;

FIGURE 5 is a graph illustrating the operation of the invention;

FIGURE 6 is a plan of a portion of the invention; and

FIGURE 7 is a plan showing a variation of the apparatus shown in FIGURE 6.

Referring now to the drawings and particularly to FIGURE 1 there is shown a plan cross-section of a viewing chamber 11 through which objects 12 (e.g. kernels of corn) are rapidly passed on the tips of ferrules 13 mounted on a rapidly rotating ferrule conveying wheel 14 such as is well known in the art. The chamber 11 has a wide slot 16 in the bottom wall, terminating in a pair of enlarged portals 17 through which the product on the ferrule wheel is rotated. To illuminate the kernel as it passes through the chamber, a pair of incandescent lamps 18 and 19 are mounted in respective tubes 21 and 22, in the walls of which collimating slits 23 and 24 are formed to define a pair of incident beams 26 and 27 intersecting on the path 28 that is followed by the kernel inside the chamber. A collecting lens 29 is mounted in the opposite wall of the chamber to receive a substantial portion of the reflected and transluminescent light coming from the kernel 12.

It will be seen that each of the beams 26, 27 is directed so as to avoid the lens 29, and so as to illuminate the kernel 12 from substantially different sides. The actual angle between each of the beams 26, 27 and the axis of the point of intersection (kernel 12) and lens 29, is about 41°, so that the angle between the beams is substantially 82°. This large angle between the beams ensures that no matter what attitude is assumed by the irregularly shaped kernel 12 on the ferrule, at some point during its passage through the chamber the kernel will receive the maximum amount of side lighting from one of the beams 26, 27 and produce thereupon a maximum amount of transluminescent light for collection by the lens 29. The larger the angle between the beams 26, 27 however, the greater is the amount of reflected light produced by the kernel and received by the lens 29. In the illustrated example, the transluminescent light produced by both beams and collected by the lens 29 is indicated by the boundaries 31, while the reflected light produced at the leading edge of the kernel by beam 27 is indicated by the boundaries 32, and the reflected light produced by the trailing edge of the kernel by beam 26 is indicated by the boundaries 34. Other reflected and transluminescent light will of course be scattered upon the interior walls 36 of the chamber 11, but will not be received by the lens 29. The interior walls 36 of the chamber are painted a non-reflecting jet black to ensure that undesired reflections are eliminated.

There is, however, one reflection that is desired, principally to provide a reference light level for uses to be described hereinafter. As shown in the figure, a cup-like light reference background member 37 is positioned in a corresponding opening in a wall of chamber 11 directly opposite the lens 29 and between the tubes 21, 22. A collimating opening 38 is formed in the wall of one of the tubes, in this case the tube 21, so that some of the light from the lamp 18 is permitted to fall upon a flat surface 39 of the member 37. The surface 39 has a predetermined reflectance value precisely selected according to known optical standards, so that when illuminated it forms a background of known brightness as viewed by the lens 29 and fills in the area of the field of view that is not filled by the kernel 12; and when the kernel is not within the field of view, the surface 39 brightness is used to provide the standard light intensity for periodically normalizing the electronic classifying system in a manner well known in the art; and also for initial adjustment of the apparatus to sort a particular product, as will be later described.

In the chamber 11 as shown in FIGURE 1, a second set of lamps 18a and 19a are provided in a pair of tubes 21a and 22a, for illuminating the kernel 12 from the opposite side as it passes through the chamber, the reflected and transluminescent light given off by the kernel being collected by a second lens 29a, and a similar background member 37a being provided for a reference. This redundancy of illumination ensures even more fully that at some point during passage of the kernel through the chamber the strongest transluminescent light will be observed by one or the other of the lenses 29, 29a, no matter what attitude is assumed by the kernel 12 on the ferrule 13. It will be understood that there may be any number of viewing chambers, each with a collecting lens and any number of lamps; and the greater the number of viewing chambers the more effective is the operation of the invention. When two pairs of lamps are used, as shown, the tubes 22 and 22a mask the brightness reference members 37 and 37a, respectively, from the light coming from lamps 18a and 18, respectively.

The light collected by the lenses 29 and 29a is processed as further shown in FIGURE 2. The chamber 11 has a pair of extension portions 41 and 41a integral therewith and defining a pair of bores 42 and 42a at right angles to the axes of the lenses 29 and 29a. As shown in FIGURE 2, a reflecting mirror 43 is positioned to reflect the light collected by the lens 29 from the object upward to the image plane 44 where the image of the product 12 is in focus. An optical frame member 46 is mounted in the plane 44 to frame the image of the object 12. The frame member 46 is made of opaque material and has a central opening 47 of a size and shape selected to frame as closely as possible the largest product 12 that is likely to be processed, so that the amount of light received when a product is in the field of view stands in the greatest possible contrast to the amount of light received from the background 39 when no product is in the field of view. The frame member 46 also limits the field of view to eliminate light reflected from adjacent products. The light passed by the frame 46 is passed through a defocusing lens combination 48 of any type well known in the art, so that the image of the object is integrated and the light beam 49 issuing from the lens combination 48 has an even cross-sectional distribution of light.

In order to make significant distinctions between the transluminescent qualities of the various products, the effects of reflected light variations must be corrected for. This is done by selecting (i.e., filtering) from the beam 49 a first band of colored light that is known to be peculiar to the reflected light, and a second band of colored light that is common to both the reflected and the transluminescent light, and is selected to produce the largest ratio of transluminescent light between the desirable and undesirable objects to be classified, measuring the intensities of the light in these bands, and using the intensity measurements to control the Y-axis and X-axis deflections of an oscilloscope beam. For example, violet light is present in the incident beams 26, 27 (FIGURE 1) and also in the beams 32, 34 of reflected light produced by both yellow field and sweet corn kernel surfaces, but not in the beam 31 of transluminescent light passed by such kernels. Yellow-green light is present in the incident beams 26, 27, in the reflected light beams 32, 34, and also in the transluminescent light beam 31 passed by both kernel types. Accordingly, the beam 49 (FIGURE 2) is split into two beams 51, 52 by means of a beam splitter 53 of any type well known in the art, and the beam 51 is passed to a violet "glare" filter 54, while the beam 52 is passed to a yellow-green "transluminescence" filter 56. The strength of the violet glare light passed by filter 54 is measured by a phototube 57, the output signal from which is fed to an amplifier 58 and is used to control the Y-axis deflection of the beam of a cathode ray oscilloscope tube 59. The strength of the yellow-green transluminescent light passed by filter 56 is measured by a phototube 61, the output signal from which is fed to an amplifier 62 and is used to control the X-axis deflection of the cathode-ray oscilloscope beam.

It will be clear from a study of this structure that, if the product were strictly opaque and produced reflected light alone, the oscilloscope beam would make excursions along an inclined line 63, herein termed the "glare line," and that therefore, if the product is in fact non-opaque, the transluminescent light passed thereby may be measured by the X-axis distance between the oscilloscope beam spot and the glare line. For example, if at a given instant, the reflected glare light from the opaque object has an arbitrary intensity such that the violet component thereof that is passed by filter 54 has the value 10.0 (as amplified by amplifier 58), while the yellow-green component thereof that is passed by filter 56 also has the value 10.0 (as amplified by amplifier 62), then the oscilloscope beam spot will fall at point 64 (FIGURE 2). If in addition the object is non-opaque and re-emits yellow-green transluminescent light of value 5.0, the beam spot will fall at point 66, or if the yellow-green transluminescent light re-emitted by the product and passed by the filter 56 has the value 15.0, the beam spot will fall at point 67. If then, the reflected light is doubled in intensity (glare of 20.0), as by a change of attitude or position of the kernel as it passes through the viewing chamber, but the transluminescent light remains at the same respective values above given, then the corresponding positions of the beam spot would be at points 64a, 66a, and 67a, respectively. It is possible, therefore, to discriminate between yellow field corn, producing for example the C-R tube spots at points 64, 64a, 66 and 66a, and yellow sweet corn, which re-emits two to three times as much yellow-green light as field corn and produces for example the C-R tube spots at points 67 and 67a. The discrimination is made by placing a mask 71 over the face of the C-R oscilloscope tube, so as to mask all parts of the tube face on which C-R spots are produced by field corn, and exposing only those parts of the C-R tube face on which the spots are produced exclusively by sweet corn. The face of the oscilloscope tube is then observed by a sentinel phototube 72, which controls an ejection device 73 through a suitable delay 74. If a C-R spot at an unmasked location (e.g., points 67, 67a) has been observed by the phototube 72, then at a suitable point in the rotational path of the product on ferrule wheel 14, the ejection device 73 causes the product to be ejected from the wheel into a "sweet corn" bin. If no spot has been observed, the product is carried by the wheel 14 to a farther point and automatically discharged or ejected into an "undesired" or "field corn" bin. It will be understood that similar components and circuits are provided to operate the ejection device 73 in accordance with the effects produced by the lamps 18a and 19a, illuminating the opposite sides of the product, and transmitting a beam through the lens 29a.

The operation of the device can be more clearly understood if it is contemplated what would happen if the violet glare filter were not used. In such case, the oscilloscope beam would move excursively only in an X-axis direction on the oscilloscope display screen, and, to take a particular example, the sweet and field corn kernels that would ordinarily produce spots at points 67 and 66a, respectively, would be indistinguishable from one another, for these points have the same abscissas. It is clear therefore that the effect of the reflected glare light must be corrected for, and that this function is performed by the glare filter 54 in combination with the transluminescence filter 56, and associated apparatus.

Variations in the amount and intensity of the transluminescent light also take place, in two respects. First, there are variations from kernel to kernel, depending on the attitude of the kernel with respect to the ferrule 13 on which it is mounted. Corn kernels are generally of elongated shape and have a width substantially greater than the thickness thereof. The ferrule 13 is generally a suction operated tube, which is rotated into a mass of randomly oriented kernels, and picks up one kernel on each rotation. The kernel may therefore be disposed on the ferrule in any of a number of orientations, for example, upstanding on one end with random orientation of the width and thickness; or lying flat on the ferrule with either a broad or narrow side engaging the ferrule, and with random orientation of the longer axis of the kernel. The smaller the cross-sectional area presented to the incident beam (26, for example) and the greater the thickness of the kernel along the beam axis, the less transluminescent light is emitted in the direction of the lens 29. However it is also true that the attitude of the kernel with respect to the beam changes as the kernel passes through the beam. The use of two beams (26, 27 for example) at a large angle to one another, plus the provision of a second pair of beams (from lamps 18a and 19a, for example) tends to ensure that the maximum cross-sectional area and minimum thickness of the kernel will be presented to at least one of the beams at some point on the kernel path 28. It is also noted that the kernel is moved through an angle of twenty degrees in passage from the field of lens 29 to the field of lens 29a, due to rotation on the vacuum conveyor wheel 14. A typical set of resulting oscilloscope beam traces is illustrated in FIGURE 3. For a field corn kernel, the oscilloscope beam spot starts at "zero" (marked "0" for "no light") and follows the glare line 63 (arrow 76) to point 77, as the kernel enters the beam 27 and sends only reflected light to lens 29. As the kernel moves farther into beams 26, 27, the oscilloscope spot follows the path marked by arrow 78 to the right and downward (increasing amount of transluminescent light and decreasing amount of reflected light from beam 27), thence to the left and upward (decreasing amount of transluminescent light and increasing amount of reflected light from beam 26), to complete the circuit approximately at point 77. Thence the spot returns along the glare line (arrow 79) to "0" as the kernel moves out of beam 26. A circuit for a sweet corn kernel producing the same reflected light is indicated by arrow 81. Circuits for field and sweet corn kernels producing stronger reflections are indicated by arrows 82 and 83, the glare line traces for both kernels being indicated by arrows 86, 87. The edge of the oscilloscope mask is indicated by line 88.

The effectiveness of the apparatus for the sorting of various types of products depends in large degree on the choice of filters 54, 56. FIGURE 4 illustrates the choice for the yellow corn used as an example in the above description. The relative transluminescence, in percent, of various filters X, A, B, C, D, and E, through which is passed transluminescent light from three types of yellow corn, is plotted on this graph. As will be seen, for filter X, which passes a band of light in the violet range (450 mµ) of visible light, the net transluminescence is zero, because no yellow corn kernels re-emit transluminescent light of this wavelength. For filters A–F, which pass bands of light in the blue through red (500–720 mµ) range of visible light, the transluminescent re-emitted light coming from "desirable" yellow sweet corn is substantially two to three times as great as the transluminescent light coming from "undesirable" yellow field corn. Accordingly, filter X is used for the glare filter 54, and any of filters A–F may be used for the transluminescent filter 56. However, in practice it has been found that a more precise selection of filters can provide separation not only of desirable yellow sweet corn from yellow field corn, but also of the desirable yellow sweet corn from an undesirable "amber" type of yellow sweet corn, a transluminescence curve for which is also plotted on the graph. From this curve it can be seen that filter B is most effective for use as the transluminescence filter 56, because it provides the greatest difference in the re-emitted transluminescent light from the two types of sweet corn. The criterion for selection of filter X is that it should pass the widest band of light as possible, without passing any transluminescent light. The energy distribution of a typical incandescent lamp is shown for illustration in FIGURE 5, with the wavelengths passed by filters X and B marked thereon.

The principle of the invention may be further understood by reference to FIGURE 3. Assume that at a particular instant, the oscilloscope beam spot is at point 89, having an ordinate of $R_1$ and an abscissa of $(R_2+D_2)$. The value $R_1$ is the measured and plotted intensity of the collected light of a first wavelength that is exclusively found in the reflected light from kernel 12 (e.g., 450 m$\mu$ if filter X is used for the glare filter). The value $R_2$ is the intensity of the reflected and collected light of a second wavelength (e.g., 550 m$\mu$, if filter B is used for the transluminescence filter), this second wavelength being common to both the reflected light and the internally diffused or transluminescent light from kernel 12. The value $D_2$ is the intensity of the collected light of the second wavelength that is contributed by the internally diffused light alone. (As herein used, the term "intensity" means the quantity of light falling on the unit area represented by the collecting lens 29.) It will be understood that the value $R_1$ has been determined and is known, and the value $(R_2+D_2)$ is known, and the problem is to determine the value of $D_2$ alone, so that the kernel 12 may be classified according to its interior light-diffusing effect, independently of its surface light-reflecting effect. The solution stems from the fact that the ratio of $R_2$ to $R_1$ has a substantially constant value, no matter how the intensity of the reflected light may vary; and this constant value may be predetermined before the sorting operation begins. One method is simply to observe the slope of the glare line 63, i.e., the actual and very distinctive glare line trace of the oscilloscope beam spot as a kernel or a series of kernels is rotated through the viewing chamber. The mask 71 may then be cut so that the working edge 88 falls along the glare line 63, and the maximum excursion $D_2$ may then be measured. In actual operation, such a step is combined with others, as will be later explained, but it will be clear that the slope $(R_2/R_1)$ of the glare line may be regarded as predetermined. With this information, the following relationship may be established:

$$D_2 = [R_2+D_2] - [R_2/R_1] \cdot [R_1]$$

It will be seen that all of the bracketed terms are known or are automatically determined by the apparatus, which therefore automatically determines the desired value $D_2$.

In actual operation, the mask 71 is cut not merely to cover the glare line 63, thus to eliminate the effect of the reflected light, but also to perform the operation of classifying the desirable and undesirable kernels according to whether their maximum excursions $D_2$ are greater or less than a predetermined value Q, representing the horizontal displacement of the working edge 88 of the mask from the glare line, the "Q" band off-set being the intensity of the transluminescent light from the undesirable seeds, for example excursions 78 and 82 in FIGURE 3. As will be seen, this cutting of the mask is done empirically, with a trial run of pre-classified kernels, and in such a way as to provide an automatic classification most closely similar to the known classification. It has been found that the value Q is not always a constant, so that the slope of the working edge 88 of the mask is not always parallel to the glare line 63; and that in fact a mask with a curved edge 88 may sometimes provide the most effective separation.

In such cases, however, even when the value Q is a variable, it may be represented as a predetermined function of the determined value $R_1$, so that a more general relationship may be established representing the full classification operation, including the cutting of the mask, as follows:

$$D_2 - Q = [R_2+D_2] - [f(R_1)]$$

in which the term $D_2-Q$ represents the X-axis displacement of the beam spot from the working edge 88 of the mask. In the example shown in FIGURE 3, the desirable seed beam spots (exposed by the mask) would have a positive value for the term $D_2-Q$, while the undesirable seed beam spots (covered by the mask) would have a negative value.

The procedure for seting up and calibrating the apparatus is as follows:

First, the frame 46 is selected as above described.

Second, the optical filters 54 and 56 are selected as follows.

With different trial filters in position 54 and 56, a black background in position 37 and an opaque standard flag in position 12 the cathode ray tube spot position controls are adjusted to place the cathode ray spot at "zero" point on the cathode ray tube screen grating. Then with various objects to be sorted (desirable and undesirable) in position 12, the horizontal (62) and vertical (58) amplifier gain controls are adjusted to deflect the cathode ray spot to the Z point on the cathode ray tube screen grating with the light from the brightest seed. This procedure is tried with various optical filter combinations. The combination that passes the least amount of light from the desirable objects with respect to the amount of light from the undesirable objects, and the largest amount of light from the desirable objects with respect to the light from the undesirable objects, is the best for the glare vertical channel 0–Y and the transluminescent horizontal channel 0–X, respectively.

Third, with a large assortment of "desired" and "undesired" kernels turning on the ferrule wheel, the sorting pattern is cut to expose the cathode ray tube spots produced by the desired seeds only to the sentinel photocell 72.

The apparatus is now calibrated for the particular type of product that is to be classified. Different parameters are needed, for example, for separating yellow sweet and field corns, than for separating white sweet and field corns. However, once the parameters for the corn type are established, they are valid for nearly any sample of that type, and such variations as may exist can be corrected for with minor adjustments. Furthermore, the parameters, established as above described, can be set on other machines without the need for using actual corn kernels as references. Instead, a reference background member of precisely known standard reflectance (for example, 0.25% reflectance) is inserted in the reference machine, and the amplifier spot position controls are adjusted to place the opaque flag beam spot in the lower left corner. The position of the beam spot without the opaque flag is then observed and recorded. Thereafter, other machines can be calibrated, as illustrated in the following exemplary instructions:

*Yellow sweet corn.*—Set sorting field by adjusting spot position controls to place 0.25% reflectance backgrounds at 25% horizontal and 100% vertical and adjust gain controls to place opaque flag at 0%. Then lock gain controls. Replace 0.25% backgrounds with 0.01% backgrounds and adjust spot position controls to place opaque flag at 0%. Use sorting pattern STR49–4A/C, which will eject the good seeds.

*White sweet corn.*—Set sorting field by adjusting spot position controls to place 0.25% reflectance backgrounds at 100% horizontal and vertical and adjust gain controls to place opaque flag at 0%. Then lock gain controls. Replace 0.25% backgrounds with 0.05% reflectance backgrounds and adjust spot position controls to place opaque flag at 0%. Use sorting pattern STR49–4B, which will eject the good seeds.

The sorting patterns referred to are for the mask 71, and are shown in FIGURES 6 and 7, respectively. In each of these figures, the mask is formed of a blank 91, consisting of a circular piece of flat opaque material having mounting perforations and keyways 92, 93, and having imprinted thereon a reference grid 94 corresponding with the oscilloscope display screen. In operation, the operator cuts out a portion of the blank 91 to leave an opening 95, the sloping edge 88 of which defines the boundary for the particular sorting pattern desired.

As an example of the operation of the apparatus, in one test 36,375 pounds of kernels were sorted by machine and were then checked by hand and eye; only one kernel was found to have been improperly classified by the apparatus.

It will be understood that the apparatus of the invention is not limited to use with visible light and corn kernels, but may with suitable changes employ any suitable type of radiation and any suitable object that, when subjected to such radiation, gives off a diffuse radiation of the same or different type.

Thus there has been described a sorting apparatus in which non-opaque objects which are illuminated one at a time by a beam of light having a predetermined composition. Some of the light is reflected from the surface of each object, and some of the light passes into the interior of the object and is diffused and re-emitted as transluminescent light. The light thus given off by the object is collected and formed into a pair of beams, each containing the same relative proportions of reflected and transluminescent light. One of these beams is passed to a "glare" filter, which passes only a predetermined wavelength band known to be peculiar to the reflected light. The other beam is passed to a "transluminescence" filter, which passes a wavelength band common to both the reflected light and the transluminescent light. The quantities of reflected light passed by the two filters stand always in the same ratio, and it is therefore possible to correct for the effect of reflected light variations. Means are provided to automatically perform such a function, and then to discriminate between the various objects on the basis of their transluminescence characteristics alone.

What is claimed is:

1. An apparatus for classifying an object according to the internal radiation-diffusing effect thereof, comprising:
   a source of predetermined radiation capable of interacting with said object to produce radiation reflected from the surface of said object and radiation diffused from the interior of said object, said reflected radiation having a first characteristic substantially exclusive thereto and a second characteristic in common with said internally diffused radiation;
   means for exposing said object to said predetermined radiation from said source; and
   means masked from said source for collecting portions of said reflected and internally diffused radiation and for automatically comparing said characteristics thereof to determine the value of said second characteristic contributed by said diffused radiation alone;
   whereby said object is classified according to the interior radiation-diffusing effect thereof, and independently of the surface radiation-reflecting effect thereof.

2. An apparatus for classifying an object according to the internal light-diffusing effect thereof, comprising:
   a source of predetermined light capable of interacting with said object to produce light reflected from the surface of said object and light diffused from the interior of said object, said reflected light including a first wavelength substantially exclusive thereto and second wavelength in common with said internally diffused light;
   means for exposing said object to said predetermined light from said source, and
   means masked from said source for collecting portions of said reflected and internally diffused light and for automatically comparing the intensities of said first and second wavelength light therein to determine the intensity of said second wavelength light contributed by said diffused light alone;
   whereby said object is classified according to the interior light-diffusing effect thereof, and independently of the surface light-reflecting effect thereof.

3. An apparatus for classifying an object according to the internal light-diffusing effect thereof, comprising:
   a source of predetermined light capable of interacting with said object to produce light reflected from the surface of said object and light diffused from the interior of said object, said reflected light including a first wavelength substantially exclusive thereto and a second wavelength in common with said internally diffused light, the intensities of said first and second wavelength light in said reflected light having a predetermined constant ratio;
   means for exposing said object to said predetermined light from said source;
   means masked from said source for collecting portions of said reflected and internally diffused light;
   means for automatically determining the respective intensities of said first and second wavelength light in said collected light; and
   means for automatically determining the difference between said collected second wavelength light intensity and the product of said ratio and said collected first wavelength light intensity, said difference being the intensity of said collected second wavelength light contributed by said diffused light alone;
   whereby said object is classified according to the interior light-diffusing effect thereof, and independently of the surface light-reflecting effect thereof.

4. An apparatus for classifying an object according to the internal light-diffusing effect thereof, comprising:
   a source of predetermined light capable of interacting with said object to produce light reflected from the surface of said object and light diffused from the interior of said object, said reflected light including a first wavelength substantially exclusive thereto and a second wavelength in common with said internally diffused light;
   means for exposing said object to said predetermined light from said source;
   means masked from said source for collecting portions of said reflected and internally diffused light;
   means for automatically determining the respective intensities of said first and second wavelength light in said collected light;
   means for automatically determining the difference between said collected second wavelength light intensity and a predetermined function of said collected first wavelength light intensity, said function representing a predetermined classification for the sorting of said object;
   whereby said object is classified according to the interior light-diffusing effect thereof, and independently of the surface light-reflecting effect thereof.

5. An apparatus for classifying an object according to the internal light-diffusing effect thereof, comprising:
   a source of predetermined light capable of interacting with said object to produce light reflected from the surface of said object and light diffused from the interior of said object, said reflected light including a first wavelength substantially exclusive thereto and a second wavelength in common with said internally diffused light;
   a chamber having a non-reflecting interior surface and means for passing said object through said chamber on a predetermined path, said light source being mounted within said chamber at one side of said path;
   collimating means mounted within said chamber for directing said light from said source in a beam intersecting said object path so as to produce said reflected and internally diffused light as said object traverses said beam;

a collecting lens mounted in a wall of said chamber and out of said beam for collecting portions of said reflected and internally diffused light;

means for automatically determining the respective intensities of said first and second wavelength light in said collected light; and means for automatically determining the difference between said collected second wavelength light intensity and a predetermined function of said collected first wavelength light intensity, said function corresponding with a predetermined classification for the sorting of said object;

whereby said object is classified according to the interior light-diffusing effect thereof, and independently of the surface light-reflecting effect thereof.

6. An apparatus for classifying an object according to the internal light-diffusing effect thereof, comprising:

a plurality of sources of predetermined light capable of interacting with said object to produce light reflected from the source of said object and light diffused from the interior of said object, said reflected light including a first wavelength substantially exclusive thereto and a second wavelength in common with said internally diffused light;

a chamber having a non-reflecting interior surface and means for passing said object through said chamber on a predetermined path, said light sources being mounted within said chamber at the sides of said path;

collimating means mounted within said chamber for directing said light from said sources in a plurality of beams intersecting said object path so as to illuminate said object from different sides at successive points on said path and to produce said reflected and internally diffused light as said object traverses each beam;

a plurality of collecting lenses mounted in the walls of said chamber and out of said beams for collecting portions of said reflected and internally diffused light;

means for automatically determining the respective intensities of said first and second wavelength light in said collected light; and means for automatically determining the difference between said collected second wavelength light intensity and a predetermined function of said collected first wavelength light intensity, said function corresponding with a predetermined class for the sorting of said object;

whereby said object is classified according to the interior light-diffusing effect thereof, and independently of the surface light-reflecting effect thereof.

7. An apparatus for classifying an object according to the internal light-diffusing effect thereof, comprising:

four sources of predetermined light capable of interacting with said object to produce light reflected from the surface of said object and light diffused from the interior of said object, said reflected light including a first wavelength substantially exclusive thereto and a second wavelength in common with said internally diffused light;

a chamber having a non-reflecting interior surface and means for passing said object through said chamber on a predetermined path, a first pair of said light sources being mounted within said chamber at one side of a first half of said path, and a second pair of said light sources being mounted within said chamber at the opposite side of the second half of said path;

each of said sources being enclosed in a housing having a collimating opening therein for directing said light from the respective source in a beam, the beams from each of said pairs of sources intersecting on said path at substantially right angles to one another, so that said object is illuminated from at least four sides at two points on said path and produces said reflected and internally diffused light as said object traverses each beam;

a pair of collecting lenses mounted in opposite walls of said chamber and out of said beams for collecting portions of said reflected and internally diffused light at said two points of illumination;

means for automatically determining the respective intensities of said first and second wavelength light in said collected light; and means for automatically determining the difference between said collected second wavelength light intensity and a predetermined function of said collected first wavelength light intensity, said function corresponding with a predetermined class for the sorting of said object;

whereby said object is classified according to the interior light-diffusing effect thereof, and independently of the surface light-reflecting effect thereof.

8. An apparatus for classifying an object according to the internal light-diffusing effect thereof, comprising:

a source of predetermined light capable of interacting with said object to produce light reflected from the surface of said object and light diffused from the interior of said object, said reflected light including a first wavelength substantially exclusive thereto and a second wavelength in common with said internally diffused light, the intensities of said first and second wavelength light in said reflected light having a predetermined constant ratio;

means for exposing said object to said predetermined light from said source;

means masked from said source for collecting portions of said reflected and internally diffused light;

means for filtering said collected light to extract said first wavelength light and said second wavelength light therefrom;

photocell means for measuring the respective intensities of said filtered first and second wavelength light and for emitting a pair of signals representative thereof; and oscilloscope means having the vertical and horizontal beam deflection controls thereof coupled to said photocell means for receiving said signals so as to cause deflection of said oscilloscope beam along one oscilloscope axis in accordance with the intensity of said filtered first wavelength light, and along the other oscilloscope axis in accordance with the intensity of said filtered second wavelength light, the trace of said oscilloscope beam for reflection only being along a predetermined glare line having a slope corresponding with said predetermined constant ratio, and the intensity of said filtered second wavelength light contributed by said diffused light alone being represented by the displacement of said oscilloscope beam from said glare line in a direction parallel to said other oscilloscope axis;

whereby said object is classified according to the interior light-diffusing effect thereof, and independently of the surface light-reflecting effect thereof.

9. An apparatus for classifying an object according to the internal light-diffusing effect thereof, comprising:

a source of predetermined light capable of interacting with said object to produce light reflected from the surface of said object and light diffused from the interior of said object, said reflected light including a first wavelength substantially exclusive thereto and a second wavelength in common with said internally diffused light, the intensities of said first and second wavelength light in said reflected light having a predetermined constant ratio;

means for exposing said object to said predetermined light from said source;

means masked from said source for collecting portions of said reflected and internally diffused light;

means for filtering said collected light to extract said first wavelength light and said second wavelength light therefrom;

photocell means for measuring the respective intensities of said filtered first and second wavelength light and for emitting a pair of signals representative thereof;

oscilloscope means having the vertical and horizontal beam deflection controls thereof coupled to said photocell means for receiving said signals so as to cause deflection of said oscilloscope beam along one oscilloscope axis in accordance with the intensity of said filtered first wavelength light, and along the other oscilloscope axis in accordance with the intensity of said filtered second wavelength light, the trace of said oscilloscope beam for reflection only being along a predetermined glare line having a slope corresponding with said predetermined constant ratio, and the intensity of said filtered second wavelength light contributed by said diffused light alone being represented by the displacement of said oscilloscope beam from said glare line in a direction parallel to said other oscilloscope axis;

an opaque mask covering a portion of the display face of said oscilloscope means, said portion including said glare line and the zone of excursion of said oscilloscope beam corresponding with a predetermined first object-class, and said mask leaving exposed another portion of said oscilloscope display face including the zone of excursion of said oscilloscope beam corresponding with a predetermined second object-class; and photocell means positioned for observing said oscilloscope display face and for emitting a signal when said oscilloscope beam spot appears in said exposed portion of said face;

whereby said object is classified in one of said object-classes according to the interior light-diffusing effect thereof, and independently of the surface light-reflecting effect thereof.

10. An apparatus for classifying an object according to the internal light-diffusing effect thereof, comprising:

a source of predetermined light capable of interacting with said object to produce light reflected from the surface of said object and light diffused from the interior of said object, said reflected light including a first wavelength substantially exclusive thereto and a second wavelength in common with said internally diffused light, the intensities of said first and second wavelength light in said reflected light having a predetermined constant ratio;

means for exposing said object to said predetermined light from said source;

means masked from said source for collecting portions of said reflected and internally diffused light;

optical beam-splitting means coupled to said collecting means for forming said collected light into a pair of beams;

a first optical filter chosen for transmitting light of substantially only said first wavelength and positioned for filtering one of said beams;

a second optical filter chosen for transmitting light of substantially only said second wavelength and positioned for filtering the other of said beams;

a first photocell positioned for receiving one of said filtered beams and emitting a first signal representing the intensity of the filtered light therein;

a second photocell positioned for receiving the other of said filtered beams and emitting a second signal representing the intensity of the filtered light therein;

oscilloscope means having the vertical and horizontal beam deflection controls thereof coupled to said photocell means for receiving said first and second signals so as to cause deflection of said oscilloscope beam along one oscilloscope axis in accordance with the intensity of said filtered first wavelength light, and along the other oscilloscope axis in accordance with the intensity of said filtered second wavelength light, the trace of said oscilloscope beam for reflection only being along a predetermined glare line having a slope corresponding with said predetermined constant ratio, and the intensity of said filtered second wavelength light contributed by said diffused light alone being represented by the displacement of said oscilloscope beam from said glare line in a direction parallel to said other oscilloscope axis;

an opaque mask covering a portion of the display face of said oscilloscope means, said portion including said glare line and the zone of excursion of said oscilloscope beam corresponding with a predetermined first object-class, and said mask leaving exposed another portion of said oscilloscope display face including the zone of excursion of said oscilloscope beam corresponding with a predetermined second object-class; and photocell means positioned for observing said oscilloscope display face and for emitting a third signal when said oscilloscope beam spot appears in said exposed portion of said face;

whereby said object is classified in one of said object-classes according to the interior light-diffusing effect thereof, and independently of the surface light-reflecting effect thereof.

11. An apparatus for classifying an object according to the internal light-diffusing effect thereof, comprising:

four sources of predetermined light capable of interacting with said object to produce light reflected from the surface of said object and light diffused from the interior of said object, said reflected light including a first wavelength substantially exclusive thereto and a second wavelength in common with said internally diffused light;

a chamber having a non-reflecting interior surface and means for passing said object through said chamber on a predetermined path, a first pair of said light sources being mounted within said chamber at one side of a first half of said path, and a second pair of said light sources being mounted within said chamber at the opposite side of the second half of said path;

each of said sources being enclosed in a housing having a collimating opening therein for directing said light from the respective source in a beam, the beams from each of said pairs of sources intersecting on said path at substantially right angles to one another and equally inclined to said path, so that said object is illuminated from at least four sides at two points on said path and produces said reflected and internally diffused light as said object traverses each beam;

a pair of collecting lenses mounted in opposite walls of said chamber with the optical axes thereof substantially perpendicular to said path at said respective two points of illumination for collecting portions of said reflected and internally diffused light at said two points of illumination;

a pair of optical background reflectance members mounted in the walls of said chamber each directly opposite a respective one of said lenses;

at least one of said housings associated with each of said background members having an opening for directing light onto said respective background member;

a pair of optical frames mounted on said chamber each on the optical path of light from a respective one of said lenses;

a pair of optical defocussing means mounted on said chamber each on the optical path of light from a respective one of said optical frames;

means coupled to each of said lenses for automatically determining the respective intensities of said first and second wavelength light in said collected light from each of said lenses; and means coupled to each of said last-named means for automatically determining the difference between said collected second wavelength light intensity and a predetermined function of said collected first wavelength light intensity, said function corresponding with a predetermined class for the sorting of said object;

whereby said object is classfied according to the interior light-diffusing effect thereof, and independently of the surface light-reflecting effect thereof.

12. An apparatus for classifying an object according to the internal light-diffusing effect thereof, comprising:

four sources of predetermined light capable of interacting with said object to produce light reflected from the surface of said object and light diffused from the interior of said object, said reflected light including a first wavelength substantially exclusive thereto and a second wavelength in common with said internally diffused light, the intensities of said first and second wavelength light in said reflected light having a predetermined constant ratio;

a chamber having a non-reflecting interior surface and means for passing said object through said chamber on a predetermined path, a first pair of said light sources being mounted within said chamber at one side of a first half of said path, and a second pair of said light sources being mounted within said chamber at the opposite side of the second half of said path;

each of said sources being enclosed in a housing having a collimating opening therein for directing said light from the respective source in a beam, the beams from each of said pairs of sources intersecting on said path at substantially right angles to one another, so that said object is illuminated from at least four sides at two points on said path and produces said reflected and internally diffused light as said object traverses each beam;

a pair of collecting lenses mounted in opposite walls of said chamber with the optical axes thereof substantially perpendicular to said path at said respective two points of illumination for collecting portions of said reflected and internally diffused light at said two points of illumination;

a pair of optical background reflectance members mounted in the walls of said chamber each directly opposite a respective one of said lenses;

at least one of said housings associated with each of said background members having an opening for directing light onto said respective background member;

a pair of optical frames mounted on said chamber each on the optical path of light from a respective one of said lenses;

a pair of optical defocussing means mounted on said chamber each on the optical path of light from a respective one of said optical frames;

optical beam-splitting means coupled to each of said collecting means for forming said collected light into a pair of beams;

a pair of first optical filters chosen for transmitting light of substantially only said first wavelength and positioned for filtering one of said beams from each of said beam-splitting means;

a pair of second optical filters chosen for transmitting light of substantially only said second wavelength and positioned for filtering the other of said beams from each of said beam-splitting means;

a pair of first photocells positioned for receiving one of said filtered beams from each of said beam-splitting means and emitting a first signal representing the intensity of the filtered light therein;

a pair of second photocells positioned for receiving the other of said filtered beams from each of said beam-splitting means and emitting a second signal representing the intensity of the filtered light therein;

a pair of oscilloscope means each having the vertical and horizontal beam deflection controls thereof coupled respectively to one of said first and one of said second photocells for receiving said respective signals so as to cause deflection of said oscilloscope beam along one oscilloscope axis in accordance with the intensity of said filtered first wavelength light, and along the other oscilloscope axis in accordance with the intensity of said filtered second wavelength light, the trace of said oscilloscope beam for reflection only being along a predetermined glare line having a slope corresponding with said predetermined constant ratio, and the intensity of said filtered second wavelength light contributed by said diffused light alone being represented by the displacement of said oscilloscope beam from said glare line in a direction parallel to said other oscilloscope axis;

a pair of opaque masks each covering a portion of the display face of one of said oscilloscope means, said portion including said glare line and the zone of excursion of said oscilloscope beam corresponding with a predetermined first object-class, and said mask leaving exposed another portion of said oscilloscope display face including the zone of excursion of said oscilloscope beam corresponding with a predetermined second object-class; and a pair of photocell means positioned for observing each of said oscilloscope display faces and for emitting a third signal when the corresponding oscilloscope beam spot appears in said exposed portion of said corresponding face;

whereby said object is classified in one of said object-classes according to the interior light-diffusing effect thereof, and independently of the surface light-reflecting effect thereof.

13. An apparatus as described in claim 12, and also including means coupled to said last-named photocell means for receiving said third signals and for sorting said object into bins corresponding with said object-classes.

References Cited

UNITED STATES PATENTS

| | | | |
|---|---|---|---|
| 2,953,963 | 9/1960 | Bulkley et al. | 250—220 X |
| 3,197,647 | 7/1965 | Fraenkel | 209—111.7 X |
| 3,255,660 | 6/1966 | Hirt | 209—111.7 X |
| 3,275,136 | 9/1966 | Allen et al. | 209—111.7 X |

ALLEN N. KNOWLES, *Primary Examiner.*